United States Patent
Gao et al.

(10) Patent No.: US 9,402,074 B2
(45) Date of Patent: Jul. 26, 2016

(54) MULTIMEDIA QUALITY MONITORING METHOD, AND DEVICE

(71) Applicant: Huawei Technologies Co., Ltd., Shenzhen (CN)

(72) Inventors: Shan Gao, Shenzhen (CN); Lina Sun, Shenzhen (CN); Qingpeng Xie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/570,992

(22) Filed: Dec. 15, 2014

(65) Prior Publication Data

US 2015/0097971 A1    Apr. 9, 2015

Related U.S. Application Data

(63) Continuation of application No. PCT/CN2013/081788, filed on Aug. 19, 2013.

(30) Foreign Application Priority Data

Aug. 22, 2012 (CN) .......................... 2012 1 0300474

(51) Int. Cl.
H04N 17/00    (2006.01)
H04N 19/154   (2014.01)

(52) U.S. Cl.
CPC ............ *H04N 17/004* (2013.01); *H04N 19/154* (2014.11)

(58) Field of Classification Search
None
See application file for complete search history.

(56) References Cited

U.S. PATENT DOCUMENTS

| 7,962,637 B2 * | 6/2011 | Su ................. H04N 21/234363 |
| | | 709/230 |
| 2007/0053303 A1 | 3/2007 | Kryuchkov |
| 2007/0268836 A1 | 11/2007 | Byun et al. |
| 2008/0144725 A1 | 6/2008 | Henocq et al. |

(Continued)

FOREIGN PATENT DOCUMENTS

| CN | 101227604 A | 7/2008 |
| CN | 101369975 A | 2/2009 |

(Continued)

OTHER PUBLICATIONS

"Series J: Cable Networks and Transmission of Television, Sound Programme and Other Multimedia Signals; Measurement of the Quality of Service; Objective Perceptual Multimedia Video Quality Measurement in the Presence of a Full Reference," Recommendation ITU-T J.247, pp. i-99, International Telecommunication Union, Geneva, Switzerland (Aug. 2008).

(Continued)

*Primary Examiner* — Michael Teitelbaum
(74) *Attorney, Agent, or Firm* — Leydig, Voit & Mayer, Ltd.

(57) ABSTRACT

Embodiments of the present invention provide a multimedia quality monitoring method, and a device. The method includes: determining reference quality of multimedia according to reference video quality and reference audio quality of the multimedia; acquiring multimedia distortion quality after at least one of video distortion and audio distortion of the multimedia occurs; and determining quality of the multimedia according to the reference quality of the multimedia and the multimedia distortion quality. Therefore, accuracy of a multimedia quality monitoring result is improved.

24 Claims, 4 Drawing Sheets

(56) References Cited

U.S. PATENT DOCUMENTS

| | | | |
|---|---|---|---|
| 2009/0244289 A1 | 10/2009 | Raake et al. | |
| 2010/0180315 A1* | 7/2010 | Nakamichi | H04N 17/004 725/116 |
| 2010/0238792 A1 | 9/2010 | Togo | |
| 2010/0284295 A1 | 11/2010 | Yamagishi et al. | |
| 2011/0075852 A1 | 3/2011 | Egi et al. | |
| 2011/0085605 A1 | 4/2011 | Xie et al. | |
| 2013/0162841 A1 | 6/2013 | Gustafsson et al. | |
| 2014/0354826 A1* | 12/2014 | Kolarov | H04N 17/004 348/175 |
| 2015/0009406 A1 | 1/2015 | Sun et al. | |

FOREIGN PATENT DOCUMENTS

| | | |
|---|---|---|
| CN | 101523916 A | 9/2009 |
| CN | 101616315 A | 12/2009 |
| CN | 101635846 A | 1/2010 |
| CN | 101911714 A | 12/2010 |
| CN | 102044248 A | 5/2011 |
| CN | 102057634 A | 5/2011 |
| CN | 102075784 A | 5/2011 |
| CN | 102170582 A | 8/2011 |
| CN | 101790107 B | 10/2012 |
| CN | 103379358 A | 10/2013 |
| EP | 1924101 A1 | 5/2008 |
| JP | 2010507324 A | 3/2010 |
| JP | 2010226258 A | 10/2010 |
| JP | 2012004779 A | 1/2012 |
| KR | 20080077085 A | 8/2008 |
| WO | 2007029731 A1 | 3/2007 |
| WO | 2007061584 A1 | 5/2007 |
| WO | 2008048155 A1 | 4/2008 |

OTHER PUBLICATIONS

Tan et al., "Perceived Video Streaming Quality Under Initial Buffering and Rebuffering Degradations," Proc. MESAQIN Conference, Measurement of Speech, Audio and Video Transmission Quality in Telecommunication Networks, Prague, Czech Republic (Jun. 2006).

"Multimedia Opinion Model Based on Media Interaction of Audio-Visual Communications," ITU-T SG12, pp. 1-6, International Telecommunication Union (Jan. 18-27, 2005).

Ries et al., "Audiovisual Quality Estimation for Mobile Streaming Services," 2$^{nd}$ International Symposium on Wireless Communication Systems, pp. 173-177, Institute of Electrical and Electronics Engineers, New York, New York (Sep. 5-7, 2005).

Kitawaki et al., "Multimedia Opinion Model Based on Media Interaction of Audio-Visual Communications," ITU-T SG12 meeting, International Telecommunication Union, Geneva, Switzerland (Jan. 18, 2005).

* cited by examiner

MULTIMEDIA QUALITY MONITORING METHOD, AND DEVICE

CROSS-REFERENCE TO RELATED APPLICATIONS

This application is a continuation of International Patent Application No. PCT/CN2013/081788, filed on Aug. 19, 2013, which claims priority to Chinese Patent Application No. 201210300474.9, filed on Aug. 22, 2012, both of which are hereby incorporated by reference in their entireties.

TECHNICAL FIELD

The present invention relates to the field of information technologies, and in particular, to a multimedia quality monitoring method, and a device.

BACKGROUND

With development of network technologies and the advent of a new era of multimedia, video on demand, web television, video telephone and the like have become main services of a broadband network. For a multimedia service, an amount of data is large, a requirement for real-time performance is high, and user sensitivity is strong; therefore, multimedia quality monitoring has a very important significance for a manufacturer and an operator of multimedia communications equipment.

In the prior art, audio quality and video quality of multimedia are separately acquired first, and then, multimedia quality is obtained by using the two types of quality. However, when cases such as packet loss and the like occurs in multimedia, it is difficult to reflect multimedia distortion caused by the packet loss by using an existing method, thereby making a multimedia quality monitoring result inaccurate.

SUMMARY

Embodiments of the present invention provide a multimedia quality monitoring method, and a device, so as to improve accuracy of a multimedia quality monitoring result.

According to a first aspect, an embodiment of the present invention provides a multimedia quality monitoring method, including:

determining reference quality of multimedia according to reference video quality and reference audio quality of the multimedia;

acquiring multimedia distortion quality that is after video distortion and/or audio distortion of the multimedia occur/occurs; and determining quality of the multimedia according to the reference quality of the multimedia and the multimedia distortion quality.

In a possible implementation manner of the first aspect, the determining reference quality of multimedia according to reference video quality and reference audio quality of the multimedia includes: determining the reference quality of the multimedia according to AV_MOSC=av1·V_MOSC+av2·A_MOSC+av3·V_MOSC·A_MOSC+av4, where AV_MOSC is the reference quality of the multimedia, V_MOSC is the reference video quality, A_MOSC is the reference audio quality, and av1, av2, av3, and av4 are constants.

In another possible implementation manner of the first aspect, the multimedia distortion quality includes: multimedia distortion quality due to packet loss and/or multimedia distortion quality due to rebuffering; and the acquiring multimedia distortion quality that is after video distortion and/or audio distortion of the multimedia occur/occurs includes: determining, according to the reference video quality and a video packet loss rate, video quality due to packet loss that is after a packet in a video of the multimedia is lost, and/or determining, according to the reference audio quality and an audio packet loss rate, audio quality due to packet loss that is after a packet in an audio of the multimedia is lost; acquiring the multimedia distortion quality due to packet loss according to the video quality due to packet loss and/or the audio quality due to packet loss; and/or acquiring the multimedia distortion quality due to rebuffering according to a rebuffering parameter, during a transmission process, of the multimedia.

In another possible implementation manner of the first aspect, the acquiring the multimedia distortion quality due to packet loss according to the video quality due to packet loss and/or the audio quality due to packet loss includes: determining video distortion quality due to packet loss according to the video quality due to packet loss and the reference video quality, and determining audio packet loss distortion quality according to the audio quality due to packet loss and the reference audio quality; determining a video packet loss distortion factor according to the video distortion quality due to packet loss and the reference video quality, and determining an audio packet loss distortion factor according to the audio packet loss distortion quality and the reference audio quality; determining a multimedia packet loss distortion factor according to the video packet loss distortion factor and the audio packet loss distortion factor; and determining the multimedia distortion quality due to packet loss according to the multimedia packet loss distortion factor and the reference quality of the multimedia.

In yet another possible implementation manner of the first aspect, the determining video distortion quality due to packet loss according to the video quality due to packet loss and the reference video quality, and determining audio packet loss distortion quality according to the audio quality due to packet loss and the reference audio quality includes: determining the video distortion quality due to packet loss V_DP to V_DP=V_MOSC−Video_MOS, where V_MOSC is the reference video quality, and Video_MOS is the video quality due to packet loss; and determining the audio packet loss distortion quality A_DP according to A_DP=A_MOSC−Audio_MOS where A_MOSC is the reference audio quality, and Audio_MOS is the audio quality due to packet loss.

In yet another possible implementation manner of the first aspect, the determining a video packet loss distortion factor according to the video distortion quality due to packet loss and the reference video quality, and determining an audio packet loss distortion factor according to the audio packet loss distortion quality and the reference audio quality includes: determining the video packet loss distortion factor AV_DFV according to $$AV\_DFV = \frac{V\_DP}{V\_MOSC} \text{ or}$$

$$AV\_DFV = \frac{V\_MOSC - Video\_MOS}{V\_MOSC},$$

where V_MOSC is the reference video quality, and V_DP is the video distortion quality due to packet loss; and/or determining the audio packet loss distortion factor AV_DFA according to $$AV\_DFA = \frac{A\_DP}{A\_MOSC} \text{ or}$$

$$AV\_DFA = \frac{A\_MOSC - Audio\_MOS}{A\_MOSC},$$

where A_MOSC is the reference audio quality, and A_DP is the audio packet loss distortion quality.

In another possible implementation manner of the first aspect, the determining a multimedia packet loss distortion factor according to the video packet loss distortion factor and the audio packet loss distortion factor includes:

determining the multimedia packet loss distortion factor AV_DF according to $$\frac{av5 \cdot AV\_DFV + av6 \cdot AV\_DFA}{1 + av5 \cdot AV\_DFV + av6 \cdot AV\_DFA} \text{ or}$$

$$AV\_DF = av5 + av6 \cdot AV\_DFV + av7 \cdot AV\_DFA,$$

where AV_DFA is the audio packet loss distortion factor, AV_DFV is the video packet loss distortion factor, and av5, av6 and av7 are constants.

In yet another possible implementation manner of the first aspect, the determining the multimedia distortion quality due to packet loss according to the multimedia packet loss distortion factor and the reference quality of the multimedia includes: determining the multimedia distortion quality due to packet loss AV_DP according to AV_DP=(AV_MOSC−MOS_MIN)·AV_DF, where AV_MOSC is the reference quality of the multimedia, MOS_MIN is lowest quality of the multimedia, and AV_DF is the multimedia packet loss distortion factor.

In another possible implementation manner of the first aspect, the rebuffering parameter includes one or any combination of the following: the number of rebufferings, rebuffering duration, an impact factor between multiple rebufferings, and multimedia initial quality.

In yet another possible implementation manner of the first aspect, the acquiring the multimedia distortion quality due to rebuffering according to a rebuffering parameter, during a transmission process, of the multimedia includes: acquiring the multimedia distortion quality due to rebuffering according to $$AV\_DR = (Audiovisual\_Quality - MOS\_MIN) \cdot$$

$$\frac{\left(\frac{NR}{av7}\right)^{av8} \cdot \left(\frac{ARL}{av9}\right)^{av10} \cdot \left(\frac{MRF}{av11}\right)^{av12}}{1 + \left(\frac{NR}{av7}\right)^{av8} \cdot \left(\frac{ARL}{av9}\right)^{av10} \cdot \left(\frac{MRF}{av11}\right)^{av12}},$$

where Audiovisual_Quality is the multimedia initial quality, NR is the number of rebufferings, ARL is the rebuffering duration, MRF is the impact factor between multiple rebufferings, and av7, av8, av9, av10, av11 and av12 are constants.

In another possible implementation manner of the first aspect, the determining quality of the multimedia according to the reference quality of the multimedia and the multimedia distortion quality includes: determining the multimedia quality due to packet loss according to the reference quality of the multimedia and the multimedia distortion quality due to packet loss; and determining the quality of the multimedia according to the reference quality of the multimedia or the multimedia quality due to packet loss, and the distortion quality due to rebuffering.

In another possible implementation manner of the first aspect, the determining the multimedia quality due to packet loss according to the reference quality of the multimedia and the multimedia distortion quality due to packet loss includes: determining the multimedia quality due to packet loss AV_MOSP according to AV_MOSP=AV_MOSC−AV_DP, where AV_MOSC is the reference quality of the multimedia, and AV_DP is the multimedia distortion quality due to packet loss.

In another possible implementation manner of the first aspect, the determining the quality of the multimedia according to the reference quality of the multimedia or the multimedia quality due to packet loss, and the distortion quality due to rebuffering includes: determining the quality AV_MOSR of the multimedia according to AV_MOSR= Audiovisual_Quality−AV_DR, where Audiovisual_Quality is the reference quality of the multimedia or the multimedia quality due to packet loss, and AV_DR is the distortion quality due to rebuffering.

According to a second aspect, an embodiment of the present invention provides a multimedia quality monitoring apparatus, including:

a first determining module, configured to determine reference quality of multimedia according to reference video quality and reference audio quality of the multimedia;

a second determining module, configured to acquire multimedia distortion quality that is after video distortion and/or audio distortion of the multimedia occur/occurs; and a third determining module, configured to determine quality of the multimedia according to the reference quality of the multimedia and the multimedia distortion quality.

In a possible implementation manner of the second aspect, the first determining module is specifically configured to:

determine the reference quality of the multimedia according to AV_MOSC=av1·V_MOSC+av2·A_MOSC+av3·V_MOSC·A_MOSC+av4, where AV_MOSC is the reference quality of the multimedia, V_MOSC is the reference video quality, A_MOSC is the reference audio quality, and av1, av2, av3, and av4 are constants.

In a possible implementation manner of the second aspect, the multimedia distortion quality includes: multimedia distortion quality due to packet loss and/or multimedia distortion quality due to rebuffering; and the second determining module is specifically configured to: determine, according to the reference video quality and a video packet loss rate, video quality due to packet loss that is after a packet in a video of the multimedia is lost, and/or determine, according to the reference audio quality and an audio packet loss rate, audio quality due to packet loss that is after a packet in an audio of the multimedia is lost; acquire the multimedia distortion quality due to packet loss according to the video quality due to packet loss and/or the audio quality due to packet loss, and/or acquire the multimedia distortion quality due to rebuffering according to a rebuffering parameter, during a transmission process, of the multimedia.

In a possible implementation manner of the second aspect, the second determining module is specifically configured to: determine video distortion quality due to packet loss according to the video quality due to packet loss and the reference video quality, and determine audio packet loss distortion quality according to the audio quality due to packet loss and the reference audio quality; determine a video packet loss distortion factor according to the video distortion quality due to packet loss and the reference video quality, and determine an audio packet loss distortion factor according to the audio packet loss distortion quality and the reference audio quality; determine a multimedia packet loss distortion factor according to the video packet loss distortion factor and the audio packet loss distortion factor; and determine the multimedia distortion quality due to packet loss according to the multimedia packet loss distortion factor and the reference quality of the multimedia.

In a possible implementation manner of the second aspect, the second determining module is specifically configured to: determine the video distortion quality due to packet loss V_DP according to V_DP=V_MOSC−Video_MOS, where V_MOSC is the reference video quality, and Video_MOS is the video quality due to packet loss; and determine the audio packet loss distortion quality A_DP according to A_DP=A_MOSC−Audio_MOS, where A_MOSC is the reference audio quality, and Audio_MOS is the audio quality due to packet loss.

In a possible implementation manner of the second aspect, the second determining module is specifically configured to: determine the video packet loss distortion factor AV_DFV according to $$AV\_DFV = \frac{V\_DP}{V\_MOSC} \text{ or}$$

$$AV\_DFV = \frac{V\_MOSC - Video\_MOS}{V\_MOSC},$$

where V_MOSC is the reference video quality, and V_DP is the video distortion quality due to packet loss; and/or, determine the audio packet loss distortion factor AV_DFA according to $$AV\_DFA = \frac{A\_DP}{A\_MOSC} \text{ or}$$

$$AV\_DFA = \frac{A\_MOSC - Audio\_MOS}{A\_MOSC},$$

where A_MOSC is the reference audio quality, and A_DP is the audio packet loss distortion quality.

In a possible implementation manner of the second aspect, the second determining module is specifically configured to: determine the multimedia packet loss distortion factor AV_DF according to $$\frac{av5 \cdot AV\_DFV + av6 \cdot AV\_DFA}{1 + av5 \cdot AV\_DFV + av6 \cdot AV\_DFA} \text{ or}$$

$$AV\_DF = av5 + av6 \cdot AV\_DFV + av7 \cdot AV\_DFA,$$

where AV_DFA is the audio packet loss distortion factor, AV_DFV is the video packet loss distortion factor, and av5, av6 and av7 are constants.

In a possible implementation manner of the second aspect, the second determining module is specifically configured to: determine the multimedia distortion quality due to packet loss AV_DP according to AV_DP=(AV_MOSC−MOS_MIN)·AV_DF, where AV_MOSC is the reference quality of the multimedia, MOS_MIN is lowest quality of the multimedia, and AV_DF is the multimedia packet loss distortion factor.

In a possible implementation manner of the second aspect, the rebuffering parameter includes one or any combination of the following: the number of rebufferings, rebuffering duration, an impact factor between multiple rebufferings, and multimedia initial quality.

In a possible implementation manner of the second aspect, the second determining module is specifically configured to: according to $$AV\_DR = (Audiovisual\_Quality - MOS\_MIN) \cdot$$

$$\frac{\left(\frac{NR}{av7}\right)^{av8} \cdot \left(\frac{ARL}{av9}\right)^{av10} \cdot \left(\frac{MRF}{av11}\right)^{av12}}{1 + \left(\frac{NR}{av7}\right)^{av8} \cdot \left(\frac{ARL}{av9}\right)^{av10} \cdot \left(\frac{MRF}{av11}\right)^{av12}}$$

acquire the multimedia distortion quality due to rebuffering, where Audiovisual_Quality is the multimedia initial quality, NR is the number of rebufferings, ARL is the rebuffering duration, MRF is the impact factor between multiple rebufferings, and av7, av8, av9, av10, av11 and av12 are constants.

In a possible implementation manner of the second aspect, the third determining module is specifically configured to: determine the multimedia quality due to packet loss according to the reference quality of the multimedia and the multimedia distortion quality due to packet loss; and determine the quality of the multimedia according to the reference quality of the multimedia or the multimedia quality due to packet loss, and the distortion quality due to rebuffering.

In a possible implementation manner of the second aspect, the third determining module is specifically configured to: determine the multimedia quality due to packet loss AV_MOSP according to AV_MOSP=AV_MOSC−AV_DP, where AV_MOSC is the reference quality of the multimedia, and AV_DP is the multimedia distortion quality due to packet loss.

In a possible implementation manner of the second aspect, the third determining module is specifically configured to: determine the quality AV_MOSR of the multimedia according to AV_MOSR=Audiovisual_Quality−AV_DR, where Audiovisual_Quality is the reference quality of the multimedia or the multimedia quality due to packet loss, and AV_DR is the distortion quality due to rebuffering.

According to a third aspect, an embodiment of the present invention further provides a terminal, including a receiving module, configured to receive multimedia; and further including the multimedia quality monitoring apparatus provided in the embodiment of the present invention.

According to a fourth aspect, an embodiment of the present invention further provides a terminal, including a receiver, configured to receive multimedia; and further including: a processor, configured to execute the multimedia quality monitoring method provided in the embodiment of the present invention.

According to a sixth aspect, an embodiment of the present invention further provides a network device, including a receiving module, configured to receive multimedia; and further including the multimedia quality monitoring apparatus provided in the embodiment of the present invention.

According to a seventh aspect, an embodiment of the present invention further provides a network device, including: a receiver, configured to receive multimedia; and further including: a processor, configured to execute the multimedia quality monitoring method provided in the embodiment of the present invention.

According to the multimedia quality monitoring method, and the device that are provided in the embodiments of the present invention, reference quality of multimedia is obtained by using reference video quality and reference audio quality of the multimedia, multimedia distortion quality that is after video distortion and/or audio distortion of the multimedia occur/occurs is acquired, and quality of the multimedia is determined according to the reference quality of the multimedia and the multimedia distortion quality. Therefore, accuracy of a multimedia quality monitoring result is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
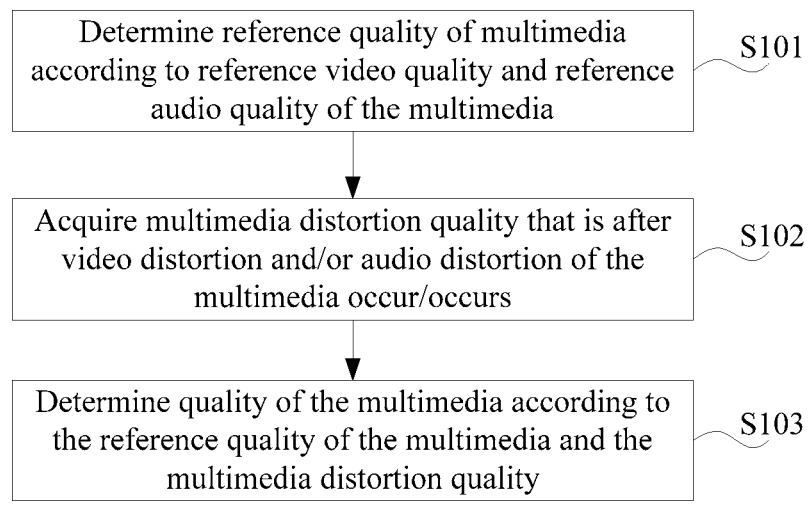
FIG. 1 is a schematic flowchart of an embodiment of a multimedia quality monitoring method according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and next-generation communications systems, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other similar communications systems.

A terminal involved in this application, that is, a user device, may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal (Mobile), a remote station, an access point, a remote terminal, an access terminal, a user terminal, a user agent, a user device, or a user equipment.

Network devices involved in the application may be various network node devices, such as base stations, base station controllers, access points (AP) on various networks, or network elements such as controllers or authenticators behind the access points and the base stations mentioned above.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

FIG. 1 is a schematic flowchart of an embodiment of a multimedia quality monitoring method according to the present invention. As shown in FIG. 1, the method includes:

S101: Determine reference quality of multimedia according to reference video quality and reference audio quality of the multimedia.

S102: Acquire multimedia distortion quality that is after video distortion and/or audio distortion of the multimedia occur/occurs.

S103: Determine quality of the multimedia according to the reference quality of the multimedia and the multimedia distortion quality.

Multimedia involved in this embodiment of the present invention refers to various multimedia files including video and audio, for example, multimedia data that is received when a terminal performs a service process, such as video on demand, web television, and video telephone.

The multimedia needs to be encoded before being transmitted, and video data and audio data in the multimedia generally need to be encoded separately. After the encoding, two transport streams, namely a video stream and an audio stream, may be transmitted; or interleaved packetization may be performed on the encoded video data and the encoded audio data, that is, one packet includes not only the video data but also the audio data, and the video data and the audio data are transmitted in one transport stream.

Because encoding of the video data and the audio data may result in distortion to a certain extent, the reference video quality of the multimedia involved in this embodiment of the present invention may be video quality that is after video encoding is performed on the video data in the multimedia, and similarly, reference audio quality of the multimedia may be audio quality that is after audio encoding is performed on the audio data in the multimedia.

In this embodiment of the present invention, various existing methods may be used to determine the reference quality of the multimedia according to the reference video quality and the reference audio quality of the multimedia.

Optionally, the reference quality of the multimedia may be determined according to $Q_{av}'=a_1 \cdot Q_{v\_coding}+a_2 \cdot Q_{a\_coding}+a_3 \cdot Q_{v\_coding} \cdot Q_{a\_coding}+a_4$, where $Q_{av}'$ is the reference quality of the multimedia, $Q_{v\_coding}$ is the reference video quality, $Q_{a\_coding}$ is the reference audio quality, and $a_1$, $a_2$, $a_3$, and $a_4$ are constants.

Multimedia distortion quality may include: multimedia distortion quality due to packet loss and/or multimedia distortion quality due to rebuffering. That is, multimedia distortion may be caused by video packet loss and/or audio packet loss, and may also be caused by a rebuffering, during a transmission process, of multimedia. It can be understood that multimedia distortion may also be caused by other reasons, for example, quality of service of a transmission channel, which may include bandwidth, time delay, jitter and the like, and a status of adaptation between parameters for an audio/video encoder and a transmission channel, where the parameters may include an encoding manner, video resolution, a video frame rate and the like.

Therefore, video quality due to packet loss may be determined according to a packet loss status of video data, or video quality due to packet loss that is after a packet in a video of the multimedia is lost may also be determined according to the reference video quality and a video packet loss rate, and the video quality due to packet loss may also be determined according to various existing methods.

Similarly, audio quality due to packet loss may be determined according to a packet loss status of audio data, or audio quality due to packet loss that is after a packet in an audio of the multimedia is lost may also be determined according to the reference audio quality and an audio packet loss rate, and the audio quality due to packet loss may also be determined according to various existing methods.

Further, multimedia distortion quality due to packet loss may be acquired according to the video quality due to packet loss and/or the audio quality due to packet loss.

Optionally, video distortion quality due to packet loss may be determined according to the video quality due to packet loss and the reference video quality, and audio packet loss distortion quality may be determined according to the audio quality due to packet loss and the reference audio quality. For example, the video distortion quality due to packet loss may be a difference between the reference video quality and the video quality due to packet loss, and similarly, the audio packet loss distortion quality may be a difference between the reference audio quality and the audio quality due to packet loss.

Further, a video packet loss distortion factor may be further determined according to the video distortion quality due to packet loss and the reference video quality, and an audio packet loss distortion factor may be determined according to the audio packet loss distortion quality and the reference audio quality. For example, the video packet loss distortion factor may be a ratio of the video distortion quality due to packet loss to the reference video quality, and similarly, the audio packet loss distortion factor may be a ratio of the audio packet loss distortion quality to the reference audio quality.

Further, a multimedia packet loss distortion factor may be determined according to the video packet loss distortion factor and the audio packet loss distortion factor. For example, the multimedia packet loss distortion factor may have a linear or non-linear relationship with the video packet loss distortion factor or the audio packet loss distortion factor, or may be a combination of linearity and non-linearity.

Finally, the multimedia distortion quality due to packet loss may be determined according to the multimedia packet loss distortion factor and the reference quality of the multimedia.

In another feasible implementation manner, a rebuffering parameter, such as the number of rebufferings, rebuffering duration, and an impact factor between multiple rebufferings, of multimedia during a transmission process may be acquired, and further, the multimedia distortion quality due to rebuffering is acquired according to the rebuffering parameter. The rebuffering parameter or a combination of the rebuffering parameters may have a linear or non-linear relationship with the multimedia distortion quality due to rebuffering, or may be in a linearity or non-linearity combined relationship.

After the multimedia distortion quality is determined, the quality of the multimedia may be determined according to the reference quality of the multimedia and the multimedia distortion quality. The multimedia distortion quality may include a multimedia distortion quality due to packet loss, or include the multimedia distortion quality due to rebuffering, or include the multimedia distortion quality due to packet loss and the multimedia distortion quality due to rebuffering.

Specifically, during a transmission process of multimedia, if no rebuffering occurs and only a case of video packet loss and/or audio packet loss occurs, the multimedia distortion quality may include only the multimedia distortion quality due to packet loss; during a transmission process of multimedia, if a rebuffering occurs but a case of video packet loss and/or audio packet loss does not occur, the multimedia distortion quality may include only the multimedia distortion quality due to rebuffering; and during a transmission process of multimedia, if not only a rebuffering occurs, but also a case of video packet loss and/or audio packet loss occurs, the multimedia distortion quality not only includes the multimedia distortion quality due to rebuffering, but also includes the multimedia distortion quality due to packet loss.

According to the multimedia quality monitoring method provided in this embodiment, reference quality of multimedia is obtained by using reference video quality and reference audio quality of the multimedia, multimedia distortion quality that is after video distortion and/or audio distortion of the multimedia occur/occurs is acquired, and quality of the multimedia is determined according to the reference quality of the multimedia and the multimedia distortion quality. Therefore, accuracy of a multimedia quality monitoring result is improved.

Figure 2:
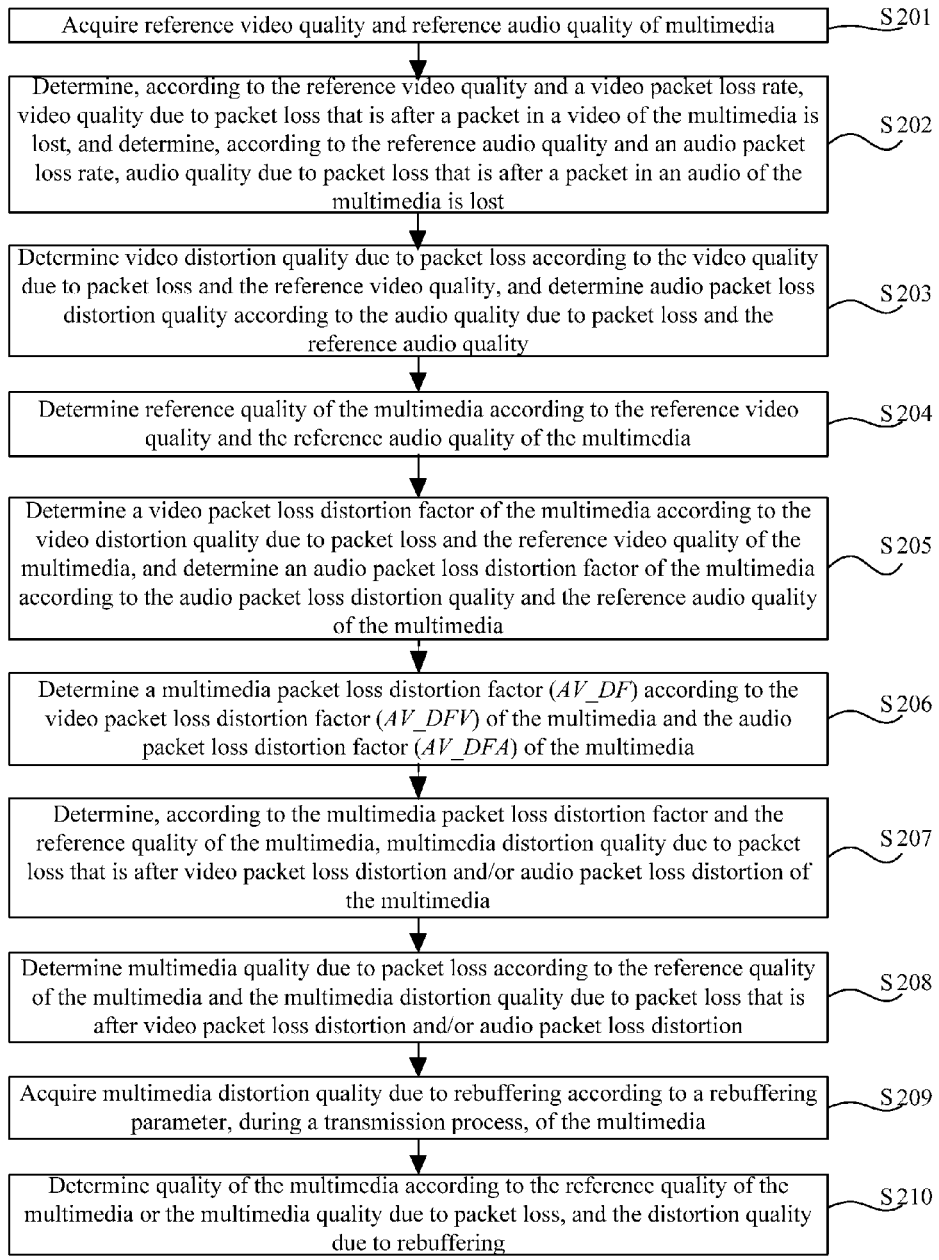
FIG. 2 is a schematic flowchart of yet another embodiment of a multimedia quality monitoring method according to the present invention.

FIG. 2 is a schematic flowchart of another embodiment of a multimedia quality monitoring method according to the present invention. As shown in FIG. 2, the method includes:

S201: Acquire reference video quality V_MOSC and reference audio quality A_MOSC of multimedia.

S202: Determine, according to the reference video quality and a video packet loss rate, video quality due to packet loss that is after a packet in a video of the multimedia is lost, and determine, according to the reference audio quality and an audio packet loss rate, audio quality due to packet loss that is after a packet in an audio of the multimedia is lost.

S203: Determine video distortion quality due to packet loss according to the video quality due to packet loss and the reference video quality, and determine audio packet loss distortion quality according to the audio quality due to packet loss and the reference audio quality.

Optionally, the video distortion quality due to packet loss V_DP may be determined according to V_DP=V_MOSC−Video_MOS, where V_MOSC is the reference video quality, and Video_MOS is the video quality due to packet loss. It should be noted that, if a case of video packet loss does not occur, Video_MOS is equal to the reference video quality.

Similarly, the audio packet loss distortion quality A_DP may be determined according to A_DP=A_MOSC−Audio_MOS, where A_MOSC is the reference audio quality, and Audio_MOS is the audio quality due to packet loss. It should be noted that, if a case audio packet loss does not occur, Audio_MOS is equal to the reference audio quality.

Video quality Video_MO that is after packet loss distortion or video distortion quality due to packet loss V_DP, and audio quality Audio_MOS of multimedia that is after packet loss or audio packet loss distortion quality A_DP are acquired.

The foregoing video quality of the multimedia that is after packet loss may be reference video quality of the multimedia or video quality due to packet loss of the multimedia, that is, if packet loss does not occur in a video of the multimedia, the quality is reference quality, and if packet loss occurs, the quality is packet loss quality.

The foregoing audio quality of the multimedia that is after packet loss may be reference audio quality of the multimedia or audio quality due to packet loss of the multimedia, that is, if packet loss does not occur in audio of the multimedia, the quality is reference quality, and if packet loss occurs, the quality is packet loss quality.

The video distortion quality due to packet loss may also be equal to the reference video quality minus the video quality due to packet loss.

Similarly, the audio packet loss distortion quality may be equal to the reference audio quality minus the audio quality due to packet loss.

S204: Determine reference quality (AV_MOSC) of the multimedia according to the reference video quality and the reference audio quality of the multimedia. The reference quality of the multimedia may be determined by using various existing methods.

Optionally, the reference quality of the multimedia may be determined according to AV_MOSC=av1·V_MOSC+av2·A_MOSC+av3·V_MOSC·A_MOSC+av4.

AV_MOSC is the reference quality of the multimedia, V_MOSC is the reference video quality, A_MOSC is the reference audio quality, and av1, av2, av3, and av4 are constants.

S205: Determine a video packet loss distortion factor (AV_DFV) of the multimedia according to the video distortion quality due to packet loss (V_DP) and the reference video quality (V_MOSC) of the multimedia, and determine an audio packet loss distortion factor (AV_DFA) of the multimedia according to the audio packet loss distortion quality (A_DP) and the reference audio quality (A_MOSC) of the multimedia.

Optionally, the video packet loss distortion factor (AV_DFV) of the multimedia may be determined according to $$AV\_DFV = \frac{V\_DP}{V\_MOSC} \text{ or}$$

$$AV\_DFV = \frac{V\_MOSC - Video\_MOS}{V\_MOSC},$$

where V_MOSC is the reference video quality, and V_DP is the video distortion quality due to packet loss of the multimedia.

Similarly, the audio packet loss distortion factor (AV_DFA) of the multimedia may be determined according to $$AV\_DFA = \frac{A\_DP}{A\_MOSC} \text{ or } AV\_DFA = \frac{A\_MOSC - Audio\_MOS}{A\_MOSC},$$

where A_MOSC is the reference audio quality, and A_DP is the audio distortion quality due to packet loss of the multimedia.

S206: Determine a multimedia packet loss distortion factor (AV_DF) according to the video packet loss distortion factor (AV_DFV) of the multimedia and the audio packet loss distortion factor (AV_DFA) of the multimedia.

The multimedia packet loss distortion factor may increase when a value of the video packet loss distortion factor of the multimedia and/or a value of the audio packet loss distortion factor of the multimedia increases, the multimedia packet loss distortion factor may have a linear or non-linear relationship with the video packet loss distortion factor of the multimedia and/or the audio packet loss distortion factor of the multimedia, or may have a relationship, combining linearity and non-linearity, with the video packet loss distortion factor of the multimedia and/or the audio packet loss distortion factor of the multimedia.

Optionally, the multimedia packet loss distortion factor (AV_DF) may be determined according to the following method:

$$AV\_DF = \frac{av5 \cdot AV\_DFV + av6 \cdot AV\_DFA}{1 + av5 \cdot AV\_DFV + av6 \cdot AV\_DFA} \text{ or}$$

$$AV\_DF = av5 + av6 \cdot AV\_DFV + av7 \cdot AV\_DFA.$$

AV_DFA is the audio packet loss distortion factor of the multimedia, AV_DFV is the video packet loss distortion factor of the multimedia, and av5, av6, and av7 are constants.

S207: Determine, according to the multimedia packet loss distortion factor and the reference quality of the multimedia, multimedia distortion quality due to packet loss that is after video packet loss distortion and/or audio packet loss distortion of the multimedia.

Optionally, the multimedia distortion quality due to packet loss AV_DP that is after video packet loss distortion and/or audio packet loss distortion of the multimedia may be determined according to AV_DP=(AV_MOSC−MOS_MIN)·AV_DF, where AV_MOSC is the reference quality of the multimedia, and MOS_MIN is lowest quality of the multimedia, for example, MOS_MIN may be set to 1, and AV_DF is the multimedia packet loss distortion factor.

S208: Determine multimedia quality due to packet loss according to the reference quality of the multimedia and the multimedia distortion quality due to packet loss that is after video packet loss distortion and/or audio packet loss distortion.

Optionally, the multimedia quality due to packet loss AV_MOSP may be determined according to AV_MOSP=AV_MOSC−AV_DP, where AV_MOSC is the reference quality of the multimedia, and AV_DP is the multimedia distortion quality due to packet loss that is after video packet loss distortion and/or audio packet loss distortion.

S209: Acquire multimedia distortion quality due to rebuffering according to a rebuffering parameter, during a transmission process, of the multimedia.

The rebuffering parameter includes one or any combination of the following: the number of rebufferings (NR), rebuffering duration (ARL), an impact factor between multiple rebufferings (MRF), and multimedia initial quality. Multimedia distortion quality due to rebuffering is calculated. The rebuffering duration may be average duration of multiple rebufferings, or may be total duration of multiple rebufferings.

Optionally, the multimedia distortion quality due to rebuffering AV_DR may be determined according to $$AV\_DR = (\text{Audiovisual\_Quality} - \text{MOS\_MIN}) \cdot \frac{\left(\frac{NR}{av7}\right)^{av8} \cdot \left(\frac{ARL}{av9}\right)^{av10} \cdot \left(\frac{MRF}{av11}\right)^{av12}}{1+\left(\frac{NR}{av7}\right)^{av8} \cdot \left(\frac{ARL}{av9}\right)^{av10} \cdot \left(\frac{MRF}{av11}\right)^{av12}},$$

where av7, av8, av9, av10, av11 and av12 are constants, and Audiovisual_Quality is multimedia initial quality. Specifically, the multimedia initial quality may be the reference quality of the multimedia or the multimedia quality due to packet loss, that is, if packet loss does not occur in the multimedia, the multimedia initial quality may be the reference quality, and if packet loss occurs, the multimedia initial quality may be the multimedia quality due to packet loss.

S210: Determine quality of the multimedia according to the reference quality of the multimedia or the multimedia quality due to packet loss, and the distortion quality due to rebuffering.

Optionally, multimedia rebuffering quality AV_MOSR may be determined according to AV_MOSR=Audiovisual_Quality−AV_DR. Audiovisual_Quality is the reference quality of the multimedia or the multimedia quality due to packet loss, AV_DR is the distortion quality due to rebuffering. The multimedia initial quality may be the reference quality of the multimedia or the multimedia quality due to packet loss, that is, if packet loss does not occur in the multimedia, the multimedia initial quality may be the reference quality, and if packet loss occurs, the multimedia initial quality may be the multimedia quality due to packet loss.

According to the multimedia quality monitoring method provided in this embodiment, reference quality of multimedia is obtained by using reference video quality and reference audio quality of the multimedia, multimedia distortion quality due to packet loss is determined by using video quality of the multimedia that is after packet loss and audio quality of the multimedia that is after packet loss, multimedia distortion quality due to rebuffering is obtained by using a rebuffering parameter, and finally, ultimate quality of the multimedia is determined according to the reference quality of the multimedia, and/or the multimedia distortion quality due to packet loss and/or the multimedia distortion quality due to rebuffering. Therefore, accuracy of a multimedia quality monitoring result is improved.

Figure 3:
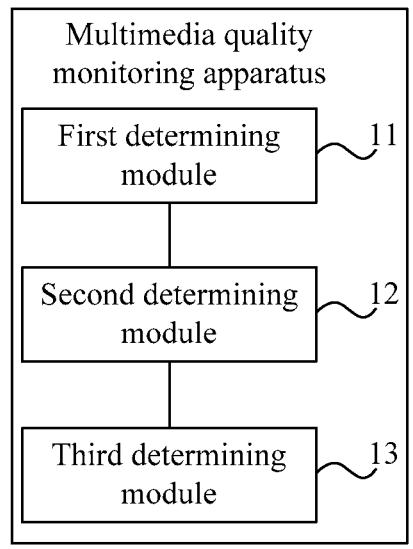
FIG. 3 is a schematic structural diagram of an embodiment of a multimedia quality monitoring apparatus according to the present invention.

FIG. 3 is a schematic structural diagram of an embodiment of a multimedia quality monitoring apparatus according to the present invention. As shown in FIG. 3, the multimedia quality monitoring apparatus includes: a first determining module 11, a second determining module 12, and a third determining module 13.

The first determining module 11 is configured to determine reference quality of multimedia according to reference video quality and reference audio quality of the multimedia.

The second determining module 12 is configured to acquire multimedia distortion quality that is after video distortion and/or audio distortion of the multimedia occur/occurs.

The third determining module 13 is configured to determine quality of the multimedia according to the reference quality of the multimedia and the multimedia distortion quality.

Optionally, the first determining module 11 may be specifically configured to:

determine the reference quality of the multimedia according to AV_MOSC=av1·V_MOSC+av2·A_MOSC+av3·V_MOSC·A_MOSC+av4, where AV_MOSC is the reference quality of the multimedia, V_MOSC is the reference video quality, A_MOSC is the reference audio quality, and av1, av2, av3, and av4 are constants.

Optionally, the multimedia distortion quality may include: multimedia distortion quality due to packet loss and/or multimedia distortion quality due to rebuffering; and the second determining module 12 may be specifically configured to: determine, according to the reference video quality and a video packet loss rate, video quality due to packet loss that is after a packet in a video of the multimedia is lost, and determine, according to the reference audio quality and an audio packet loss rate, audio quality due to packet loss that is after a packet in an audio of the multimedia is lost; acquire the multimedia distortion quality due to packet loss according to the video quality due to packet loss and/or the audio quality due to packet loss, and/or acquire the multimedia distortion quality due to rebuffering according to a rebuffering parameter, during a transmission process, of the multimedia.

Optionally, the second determining module 12 may be specifically configured to: determine video distortion quality due to packet loss according to the video quality due to packet loss and the reference video quality, and determine audio packet loss distortion quality according to the audio quality due to packet loss and the reference audio quality; determine a video packet loss distortion factor according to the video distortion quality due to packet loss and the reference video quality, and determine an audio packet loss distortion factor according to the audio packet loss distortion quality and the reference audio quality; determine a multimedia packet loss distortion factor according to the video packet loss distortion factor and the audio packet loss distortion factor; and determine the multimedia distortion quality due to packet loss according to the multimedia packet loss distortion factor and the reference quality of the multimedia.

Optionally, the second determining module 12 may be specifically configured to:

determine the video distortion quality due to packet loss V_DP according to V_DP=V_MOSC−Video_MOS, where V_MOSC is the reference video quality, and Video_MOS is the video quality due to packet loss; and determine the audio packet loss distortion quality A_DP according to A_DP=A_MOSC−Audio_MOS, where A_MOSC is the reference audio quality, and Audio_MOS is the audio quality due to packet loss.

Optionally, the second determining module 12 may be specifically configured to:

determine the video packet loss distortion factor AV_DFV according to $$AV\_DFV = \frac{V\_DP}{V\_MOSC} \text{ or } AV\_DFV = \frac{V\_MOSC - Video\_MOS}{V\_MOSC},$$

where V_MOSC is the reference video quality, and V_DP is the video distortion quality due to packet loss; and/or, determine the audio packet loss distortion factor AV_DFA according to $$AV\_DFA = \frac{A\_DP}{A\_MOSC} \text{ or } AV\_DFA = \frac{A\_MOSC - Audio\_MOS}{A\_MOSC},$$

where A_MOSC is the reference audio quality, and A_DP is the audio packet loss distortion quality.

Optionally, the second determining module 12 may be further specifically configured to: determine the multimedia packet loss distortion factor AV_DF according to $$\frac{av5 \cdot AV\_DFV + av6 \cdot AV\_DFA}{1 + av5 \cdot AV\_DFV + av6 \cdot AV\_DFA} \text{ or}$$

$$AV\_DF = av5 + av6 \cdot AV\_DFV + av7 \cdot AV\_DFA,$$

where AV_DFA is the audio packet loss distortion factor, AV_DFV is the video packet loss distortion factor, and av5, av6 and av7 are constants.

Optionally, the second determining module 12 may be specifically configured to: determine the multimedia distortion quality due to packet loss AV_DP according to AV_DP=(AV_MOSC−MOS_MIN)·AV_DF, where AV_MOSC is the reference quality of the multimedia, MOS_MIN is lowest quality of the multimedia, and AV_DF is the multimedia packet loss distortion factor.

Optionally, the rebuffering parameter may include one or any combination of the following: the number of rebufferings, rebuffering duration, an impact factor between multiple rebufferings, and multimedia initial quality.

Optionally, the second determining module 12 may be specifically configured to acquire the multimedia distortion quality due to rebuffering according to $$AV\_DR = (Audiovisual\_Quality - MOS\_MIN) \cdot$$

$$\frac{\left(\frac{NR}{av7}\right)^{av8} \cdot \left(\frac{ARL}{av9}\right)^{av10} \cdot \left(\frac{MRF}{av11}\right)^{av12}}{1 + \left(\frac{NR}{av7}\right)^{av8} \cdot \left(\frac{ARL}{av9}\right)^{av10} \cdot \left(\frac{MRF}{av11}\right)^{av12}},$$

where Audiovisual_Quality is the multimedia initial quality, NR is the number of rebufferings, ARL is the rebuffering duration, MRF is the impact factor between multiple rebufferings, and av7, av8, av9, av10, av11 and av12 are constants.

Optionally, the third determining module 13 may be specifically configured to: determine multimedia quality due to packet loss according to the reference quality of the multimedia and the multimedia distortion quality due to packet loss; and determine quality of the multimedia according to the reference quality of the multimedia or the multimedia quality due to packet loss, and the distortion quality due to rebuffering.

Optionally, the third determining module 13 may be specifically configured to:

determine the multimedia quality due to packet loss AV_MOSP according to AV_MOSP=AV_MOSC−AV_DP, where AV_MOSC is the reference quality of the multimedia, and AV_DP is the multimedia distortion quality due to packet loss.

Optionally, the third determining module 13 may be specifically configured to:

determine the quality AV_MOSR of the multimedia according to AV_MOSR=Audiovisual_Quality−AV_DR, where Audiovisual_Quality is the reference quality of the multimedia or the multimedia quality due to packet loss, and AV_DR is the distortion quality due to rebuffering.

The multimedia quality monitoring apparatus provided in the embodiment of the present invention corresponds to the multimedia quality monitoring method provided in the embodiment of the present invention, and is a device for executing the multimedia quality monitoring method. For a process of executing, by the apparatus, the multimedia quality monitoring method, refer to method embodiments, and no details are repeatedly described herein.

According to the multimedia quality monitoring apparatus provided in this embodiment of the present invention, reference quality of multimedia is obtained by using reference video quality and reference audio quality of the multimedia, multimedia distortion quality due to packet loss is determined by using video quality of the multimedia that is after packet loss and audio quality of the multimedia that is after packet loss, multimedia distortion quality due to rebuffering is obtained by using a rebuffering parameter, and finally, ultimate quality of the multimedia is determined according to the reference quality of the multimedia, and/or the multimedia distortion quality due to packet loss and/or the multimedia distortion quality due to rebuffering. Therefore, accuracy of a multimedia quality monitoring result is improved.

Figure 4:
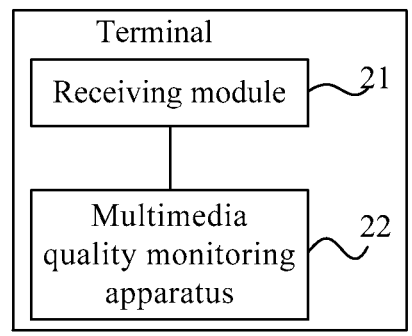
FIG. 4 is a schematic structural diagram of an embodiment of a terminal according to the present invention.

FIG. 4 is a schematic structural diagram of an embodiment of a terminal according to the present invention. As shown in FIG. 4, the terminal includes: a receiving module 21 and a multimedia quality monitoring apparatus 22.

The receiving module 21 is configured to receive multimedia.

For a structure of the multimedia quality monitoring apparatus 22 and functions of modules in the multimedia quality monitoring apparatus 22, refer to related description in the embodiment shown in FIG. 3, and no details are repeatedly described herein.

Figure 5:
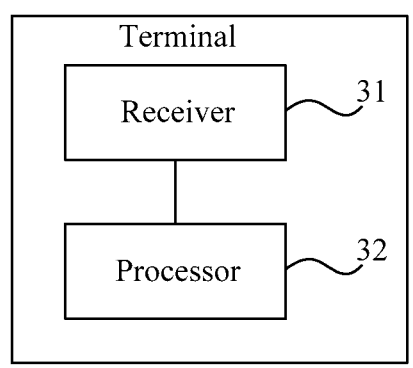
FIG. 5 is a schematic structural diagram of yet another embodiment of a terminal according to the present invention.

FIG. 5 is a schematic structural diagram of yet another embodiment of a terminal according to the present invention. As shown in FIG. 5, the terminal includes: a receiver 31 and a processor 32.

The receiver 31 is configured to receive multimedia.

The processor 32 may execute the multimedia quality monitoring methods provided in the embodiments, shown in FIG. 1 and FIG. 2, of the present invention. For specific processes of executing, by the processor 32, the multimedia quality monitoring methods, refer to related description in the embodiments shown in FIG. 1 and FIG. 2, and no details are repeatedly described herein.

According to the terminal provided in this embodiment of the present invention, reference quality of multimedia is obtained by using reference video quality and reference audio quality of the multimedia, multimedia distortion quality that is after multimedia distortion is determined by using video quality that is after video distortion of the multimedia and audio quality that is after audio distortion of the multimedia, and finally, quality of the multimedia is determined according to the reference quality of the multimedia and the multimedia quality that is after the distortion. Therefore, accuracy of a multimedia quality monitoring result is improved.

Figure 6:
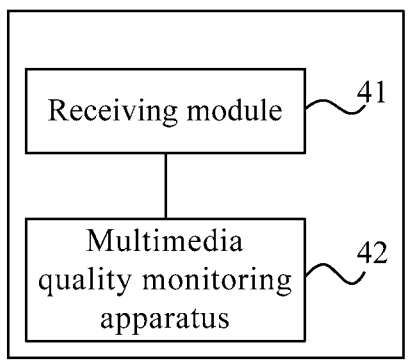
FIG. 6 is a schematic structural diagram of an embodiment of a network device according to the present invention.

FIG. 6 is a schematic structural diagram of an embodiment of a network device according to the present invention. As shown in FIG. 6, the network device includes: a receiving module 41 and a multimedia quality monitoring apparatus 42.

The receiving module 41 is configured to receive multimedia.

For a structure of the multimedia quality monitoring apparatus 42 and functions of modules within the multimedia quality monitoring apparatus 42, refer to related description in the embodiment shown in FIG. 3, and no details are repeatedly described herein.

Figure 7:
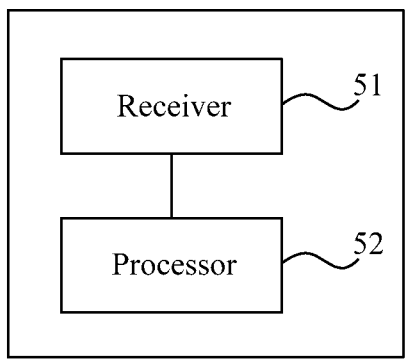
FIG. 7 is a schematic structural diagram of yet another embodiment of a network device according to the present invention.

FIG. 7 is a schematic structural diagram of yet another embodiment of a network device according to the present invention. As shown in FIG. 7, the network device includes: a receiver 51 and a processor 52.

The receiver 51 is configured to receive multimedia.

The processor 52 may execute the multimedia quality monitoring methods provided in the embodiments, shown in FIG. 1 and FIG. 2, of the present invention. For specific processes of executing, by the processor 52, the multimedia quality monitoring methods, refer to related description in the embodiments shown in FIG. 1 and FIG. 2, and no details are repeatedly described herein.

According to the network device provided in this embodiment of the present invention, reference quality of multimedia is obtained by using reference video quality and reference audio quality of the multimedia, multimedia distortion quality due to packet loss is determined by using video quality of the multimedia that is after packet loss and audio quality of the multimedia that is after packet loss, multimedia distortion quality due to rebuffering is obtained by using a rebuffering parameter, and finally, ultimate quality of the multimedia is determined according to the reference quality of the multimedia, and/or the multimedia distortion quality due to packet loss and/or the multimedia distortion quality due to rebuffering. Therefore, accuracy of a multimedia quality monitoring result is improved.

It may be clearly understood by a person skilled in the art that, for the purpose of convenient and brief description, division of the foregoing functional modules is taken as an example for illustration. In an actual application, the foregoing functions may be allocated to different functional modules and implemented according to needs, that is, an inner structure of an apparatus is divided into different functional modules to implement all or part of the functions described above. For a specific working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that may store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from and scope of the technical solutions of the embodiments of the present application.

What is claimed is:

1. A multimedia quality monitoring method, comprising:
   determining, by a multimedia quality monitoring apparatus, reference quality of multimedia according to reference video quality and reference audio quality of the multimedia;
   acquiring, by the multimedia quality monitoring apparatus, multimedia distortion quality after at least one of video distortion and audio distortion of the multimedia occurs; and
   determining, by the multimedia quality monitoring apparatus, quality of the multimedia according to the reference quality of the multimedia and the multimedia distortion quality;
   wherein the multimedia distortion quality comprises: multimedia distortion quality due to at least one of packet loss and rebuffering; and
   wherein acquiring the multimedia distortion quality after at least one of video distortion and audio distortion of the multimedia occurs comprises:
   determining, at least one of the following:
   (a) according to the reference video quality and a video packet loss rate, video quality due to packet loss after a packet in a video of the multimedia is lost, and (b) according to the reference audio quality and an audio packet loss rate, audio quality due to packet loss after a packet in an audio of the multimedia is lost;
acquiring the multimedia distortion quality due to at least one of the following:
(i) packet loss according to the video quality; and
(ii) rebuffing parameter, during a transmission process, of the multimedia;
wherein acquiring the multimedia distortion quality due to at least one of the video quality due to packet loss and the audio quality due to packet loss comprises:
determining at least one of video distortion quality due to packet loss and audio packet loss distortion quality due to packet loss, wherein the video distortion quality due to packet loss is determined according to the video quality due to packet loss and the reference video quality, and the audio packet loss distortion quality due to packet loss is determined according to the audio quality due to packet loss and the reference audio quality;
determining at least one of a video packet loss distortion factor and an audio packet loss distortion factor, wherein the video packet loss distortion factor is determined according to the video distortion quality due to packet loss and the reference video quality, and the audio packet loss distortion factor is determined according to the audio packet loss distortion quality and the reference audio quality;
determining a multimedia packet loss distortion factor according to at least one of the video packet loss distortion factor and the audio packet loss distortion factor; and
determining the multimedia distortion quality due to packet loss according to the multimedia packet loss distortion factor and the reference quality of the multimedia.

2. The method according to claim 1, wherein determining the reference quality of the multimedia according to the reference video quality and the reference audio quality of the multimedia comprises:
determining the reference quality of the multimedia according to AV_MOSC=av1·V_MOSC+av2·A_MOSC+av3·V_MOSC·A_MOSC+av4, wherein AV_MOSC is the reference quality of the multimedia, V_MOSC is the reference video quality, A_MOSC is the reference audio quality, and av1, av2, av3, and av4 are constants.

3. The method according to claim 1, wherein determining the video distortion quality due to packet loss according to the video quality due to packet loss and the reference video quality, and determining the audio packet loss distortion quality according to the audio quality due to packet loss and the reference audio quality comprises:
determining the video distortion quality due to packet loss V_DP according to V_DP=V_MOSC−Video_MOS, wherein V_MOSC is the reference video quality, and Video_MOS is the video quality due to packet loss; and
determining the audio packet loss distortion quality A_DP according to A_DP=A_MOSC−Audio_MOS wherein A_MOSC is the reference audio quality, and Audio_MOS is the audio quality due to packet loss.

4. The method according to claim 1, wherein determining the video packet loss distortion factor according to the video distortion quality due to packet loss and the reference video quality, and determining the audio packet loss distortion factor according to the audio packet loss distortion quality and the reference audio quality comprises at least one of the following:

(a) determining the video packet loss distortion factor AV_DFV according to $$AV\_DFV = \frac{V\_DP}{V\_MOSC} \text{ or } AV\_DFV = \frac{V\_MOSC - Video\_MOS}{V\_MOSC},$$

wherein V_MOSC is the reference video quality, and V_DP is the video distortion quality due to packet loss; and (b) determining the audio packet loss distortion factor AV_DFA according to $$AV\_DFA = \frac{A\_DP}{A\_MOSC} \text{ or } AV\_DFA = \frac{A\_MOSC - Audio\_MOS}{A\_MOSC},$$

wherein A_MOSC is the reference audio quality, and A_DP is the audio packet loss distortion quality.

5. The method according to claim 1, wherein determining the multimedia packet loss distortion factor according to the video packet loss distortion factor and the audio packet loss distortion factor comprises:
determining the multimedia packet loss distortion factor AV_DF according to $$\frac{av5 \cdot AV\_DFV + av6 \cdot AV\_DFA}{1 + av5 \cdot AV\_DFV + av6 \cdot AV\_DFA}$$

wherein AV_DFA is the audio packet loss distortion factor, AV_DFV is the video packet loss distortion factor, and av5, av6 and av7 are constants.

6. The method according to claim 1, wherein determining the multimedia distortion quality due to packet loss according to the multimedia packet loss distortion factor and the reference quality of the multimedia comprises:
determining the multimedia distortion quality due to packet loss AV_DP according to AV_DP=(AV_MOSC−MOS_MIN)·AV_DF, wherein AV_MOSC is the reference quality of the multimedia, MOS_MIN is lowest quality of the multimedia, and AV_DF is the multimedia packet loss distortion factor,
wherein AV_MOSC is the reference quality of the multimedia, MOS_MIN is lowest quality of the multimedia, and AV_DF is the multimedia packet loss distortion factor.

7. A multimedia quality monitoring method, comprising:
determining, by a multimedia quality monitoring apparatus, reference quality of multimedia according to reference video quality and reference audio quality of the multimedia;
acquiring, by the multimedia quality monitoring apparatus, multimedia distortion quality after at least one of video distortion and audio distortion of the multimedia occurs; and
determining, by the multimedia quality monitoring apparatus, quality of the multimedia according to the reference quality of the multimedia and the multimedia distortion quality;
wherein the multimedia distortion quality comprises: multimedia distortion quality due to at least one of packet loss and rebuffering; and
wherein acquiring the multimedia distortion quality after at least one of video distortion and audio distortion of the multimedia occurs comprises:

determining, at least one of the following:
(a) according to the reference video quality and a video packet loss rate, video quality due to packet loss after a packet in a video of the multimedia is lost, and
(b) according to the reference audio quality and an audio packet loss rate, audio quality due to packet loss after a packet in an audio of the multimedia is lost;
acquiring the multimedia distortion quality due to at least one of the following:
(i) packet loss according to the video quality; and
(ii) rebuffing parameter, during a transmission process, of the multimedia;
wherein the rebuffering parameter comprises one or any combination of the following: a quantity of rebufferings, rebuffering duration, an impact factor between multiple rebufferings, and multimedia initial quality;
wherein acquiring the multimedia distortion quality due to rebuffering according to the rebuffering parameter, comprises: acquiring the multimedia distortion quality due to rebuffering AV_DR according to $$AV\_DR = (Audiovisual\_Quality - MOS\_MIN) \cdot \frac{\left(\frac{NR}{av7}\right)^{av8} \cdot \left(\frac{ARL}{av9}\right)^{av10} \cdot \left(\frac{MRF}{av11}\right)^{av12}}{1 + \left(\frac{NR}{av7}\right)^{av8} \cdot \left(\frac{ARL}{av9}\right)^{av10} \cdot \left(\frac{MRF}{av11}\right)^{av12}},$$

wherein Audiovisual_Quality is the multimedia initial quality, NR is the quantity of rebufferings, ARL is the rebuffering duration, MRF is the impact factor between multiple rebufferings, and av7, av8, av9, av10, av11 and av12 are constants.

8. The method according to claim 7, wherein determining the quality of the multimedia according to the reference quality of the multimedia and the multimedia distortion quality comprises:
determining a multimedia quality due to packet loss according to the reference quality of the multimedia and the multimedia distortion quality due to packet loss; and
determining the quality of the multimedia according to the reference quality of the multimedia or the multimedia quality due to packet loss, and the multimedia distortion quality due to rebuffering.

9. The method according to claim 8, wherein determining the multimedia quality due to packet loss according to the reference quality of the multimedia and the multimedia distortion quality due to packet loss comprises:
determining the multimedia quality due to packet loss AV_MOSP according to AV_MOSP=AV_MOSC−AV_DP, wherein AV_MOSC is the reference quality of the multimedia, and AV_DP is the multimedia distortion quality due to packet loss.

10. The method according to claim 8, wherein determining the quality of the multimedia according to the reference quality of the multimedia or the multimedia quality due to packet loss, and the multimedia distortion quality due to rebuffering comprises:
determining the quality AV_MOSR of the multimedia according to AV_MOSR=Audiovisual_Quality−AV_DR, wherein Audiovisual_Quality is the reference quality of the multimedia or the multimedia quality due to packet loss, and AV_DR is the multimedia distortion quality due to rebuffering.

11. A multimedia quality monitoring apparatus comprising a processor and a memory, wherein the memory stores an instruction that enables the processor to implement the following operations:

determining reference quality of multimedia according to reference video quality and reference audio quality of the multimedia;
acquiring multimedia distortion quality after at least one of video distortion and audio distortion of the multimedia occurs; and
determining quality of the multimedia according to the reference quality of the multimedia and the multimedia distortion quality;
wherein the multimedia distortion quality comprises: multimedia distortion quality due to at least one of packet loss and rebuffering; and
wherein acquiring the multimedia distortion quality after at least one of video distortion and audio distortion of the multimedia occurs comprises:
determining, at least one of the following:
(a) according to the reference video quality and a video packet loss rate, video quality due to packet loss after a packet in a video of the multimedia is lost, and
(b) according to the reference audio quality and an audio packet loss rate, audio quality due to packet loss after a packet in an audio of the multimedia is lost;
acquiring the multimedia distortion quality due to at least one of the following:
(i) packet loss according to the video quality; and
(ii) rebuffing parameter, during a transmission process, of the multimedia;
wherein acquiring the multimedia distortion quality due to at least one of the video quality due to packet loss and the audio quality due to packet loss comprises:
determining at least one of video distortion quality due to packet loss and audio packet loss distortion quality due to packet loss, wherein the video distortion quality due to packet loss is determined according to the video quality due to packet loss and the reference video quality, and the audio packet loss distortion quality due to packet loss is determined according to the audio quality due to packet loss and the reference audio quality;
determining at least one of a video packet loss distortion factor and an audio packet loss distortion factor, wherein the video packet loss distortion factor is determined according to the video distortion quality due to packet loss and the reference video quality, and the audio packet loss distortion factor is determined according to the audio packet loss distortion quality and the reference audio quality;
determining a multimedia packet loss distortion factor according to at least one of the video packet loss distortion factor and the audio packet loss distortion factor; and
determining the multimedia distortion quality due to packet loss according to the multimedia packet loss distortion factor and the reference quality of the multimedia.

12. The apparatus according to claim 11, wherein determining the reference quality of the multimedia according to the reference video quality and the reference audio quality of the multimedia comprises:
determining the reference quality of the multimedia according to AV_MOSC=av1·V_MOSC+av2·A_MOSC+av3·V_MOSC·A_MOSC+av4, wherein AV_MOSC is the reference quality of the multimedia, V_MOSC is the reference video quality, A_MOSC is the reference audio quality, and av1, av2, av3, and av4 are constants.

13. The apparatus according to claim 11, wherein determining the video distortion quality due to packet loss according to the video quality due to packet loss and the reference video quality, and determining the audio packet loss distortion quality according to the audio quality due to packet loss and the reference audio quality comprises:

determining the video distortion quality due to packet loss V_DP according to V_DP=V_MOSC−Video_MOS, wherein V_MOSC is the reference video quality, and Video_MOS is the video quality due to packet loss; and determining the audio packet loss distortion quality A_DP according to A_DP=A_MOSC−Audio_MOS, wherein A_MOSC is the reference audio quality, and Audio_MOS is the audio quality due to packet loss.

14. The apparatus according to claim 11, wherein determining the video packet loss distortion factor according to the video distortion quality due to packet loss and the reference video quality, and determining the audio packet loss distortion factor according to the audio packet loss distortion quality and the reference audio quality comprises at least one of the following:

(a) determining the video packet loss distortion factor AV_DFV according to $$AV\_DFV = \frac{V\_DP}{V\_MOSC} \text{ or } AV\_DFV = \frac{V\_MOSC - Video\_MOS}{V\_MOSC},$$

wherein V_MOSC is the reference video quality, and V_DP is the video distortion quality due to packet loss; and (b) determining the audio packet loss distortion factor AV_DFA according to $$AV\_DFA = \frac{A\_DP}{A\_MOSC} \text{ or } AV\_DFA = \frac{A\_MOSC - Audio\_MOS}{A\_MOSC},$$

wherein A_MOSC is the reference audio quality, and A_DP is the audio packet loss distortion quality.

15. The apparatus according to claim 11, wherein determining the multimedia packet loss distortion factor according to the video packet loss distortion factor and the audio packet loss distortion factor comprises:

determining the multimedia packet loss distortion factor AV_DF according to $$\frac{av5 \cdot AV\_DFV + av6 \cdot AV\_DFA}{1 + av5 \cdot AV\_DFV + av6 \cdot AV\_DFA}$$

wherein AV_DFA is the audio packet loss distortion factor, AV_DFV is the video packet loss distortion factor, and av5, av6 and av7 are constants.

16. The apparatus according to claim 11, wherein determining the multimedia distortion quality due to packet loss according to the multimedia packet loss distortion factor and the reference quality of the multimedia comprises:

determining the multimedia distortion quality due to packet loss AV_DP according to AV_DP=(AV_MOSC−MOS_MIN)·AV_DF, wherein AV_MOSC is the reference quality of the multimedia, MOS_MIN is lowest quality of the multimedia, and AV_DF is the multimedia packet loss distortion factor, wherein AV_MOSC is the reference quality of the multimedia, MOS_MIN is lowest quality of the multimedia, and AV_DF is the multimedia packet loss distortion factor.

17. A multimedia quality monitoring apparatus comprising a processor and a memory, wherein the memory stores an instruction that enables the processor to implement the following operations:

determining reference quality of multimedia according to reference video quality and reference audio quality of the multimedia;

acquiring multimedia distortion quality after at least one of video distortion and audio distortion of the multimedia occurs; and determining quality of the multimedia according to the reference quality of the multimedia and the multimedia distortion quality;

wherein the multimedia distortion quality comprises: multimedia distortion quality due to at least one of packet loss and rebuffering; and wherein acquiring the multimedia distortion quality after at least one of video distortion and audio distortion of the multimedia occurs comprises:

determining, at least one of the following:

(a) according to the reference video quality and a video packet loss rate, video quality due to packet loss after a packet in a video of the multimedia is lost, and (b) according to the reference audio quality and an audio packet loss rate, audio quality due to packet loss after a packet in an audio of the multimedia is lost;

acquiring the multimedia distortion quality due to at least one of the following:

(i) packet loss according to the video quality; and (ii) rebuffing parameter, during a transmission process, of the multimedia;

wherein the rebuffering parameter comprises one or any combination of the following: a quantity of rebufferings, rebuffering duration, an impact factor between multiple rebufferings, and multimedia initial quality;

wherein acquiring the multimedia distortion quality due to rebuffering according to the rebuffering parameter, comprises: acquiring the multimedia distortion quality due to rebuffering AV_DR according to $$AV\_DR = (\text{Audiovisual\_Quality} - \text{MOS\_MIN}) \cdot \frac{\left(\frac{NR}{av7}\right)^{av8} \cdot \left(\frac{ARL}{av9}\right)^{av10} \cdot \left(\frac{MRF}{av11}\right)^{av12}}{1 + \left(\frac{NR}{av7}\right)^{av8} \cdot \left(\frac{ARL}{av9}\right)^{av10} \cdot \left(\frac{MRF}{av11}\right)^{av12}},$$

wherein Audiovisual_Quality is the multimedia initial quality, NR is the quantity of rebufferings, ARL is the rebuffering duration, MRF is the impact factor between multiple rebufferings, and av7, av8, av9, av10, av11 and av12 are constants.

18. The apparatus according to claim 17, wherein determining the quality of the multimedia according to the reference quality of the multimedia and the multimedia distortion quality comprises:

determining a multimedia quality due to packet loss according to the reference quality of the multimedia and the multimedia distortion quality due to packet loss; and determining the quality of the multimedia according to the reference quality of the multimedia or the multimedia quality due to packet loss, and the multimedia distortion quality due to rebuffering.

19. The apparatus according to claim 18, wherein determining the multimedia quality due to packet loss according to the reference quality of the multimedia and the multimedia distortion quality due to packet loss comprises:

determining the multimedia quality due to packet loss AV_MOSP according to AV_MOSP=AV_MOSC−AV_DP, wherein AV_MOSC is the reference quality of the multimedia, and AV_DP is the multimedia distortion quality due to packet loss.

20. The apparatus according to claim 18, wherein determining the quality of the multimedia according to the reference quality of the multimedia or the multimedia quality due to packet loss, and the multimedia distortion quality due to rebuffering comprises:

determining the quality AV_MOSR of the multimedia according to AV_MOSR=Audiovisual_Quality−AV_DR, wherein Audiovisual_Quality is the reference quality of the multimedia or the multimedia quality due to packet loss, and AV_DR is the multimedia distortion quality due to rebuffering.

21. A method for acquiring a multimedia distortion quality due to packet loss, the method comprising:

determining at least one of (a) a video distortion quality due to packet loss and (b) an audio packet loss distortion quality due to packet loss, where the video distortion quality is determined according to a video quality due to packet loss and a reference video quality, and the audio packet loss distortion quality is determined according to an audio quality due to packet loss and a reference audio quality;

determining at least one of (a) a video packet loss distortion factor and (b) an audio packet loss distortion factor, where the video packet loss distortion factor is determined according to the video distortion quality and the reference video quality, and the audio packet loss distortion factor is determined according to the audio packet loss distortion quality and the reference audio quality;

determining a multimedia packet loss distortion factor according to at least one of the video packet loss distortion factor and the audio packet loss distortion factor; and determining the multimedia distortion quality due to packet loss according to the multimedia packet loss distortion factor and the reference quality of the multimedia.

22. A method for acquiring a multimedia distortion quality due to packet loss due to rebuffering according to a rebuffering parameter, the method comprising:

acquiring a multimedia distortion quality due to rebuffering AV_DR according to $$AV\_DR = (Audiovisual\_Quality - MOS\_MIN) \cdot \frac{\left(\frac{NR}{av7}\right)^{av8} \cdot \left(\frac{ARL}{av9}\right)^{av10} \cdot \left(\frac{MRF}{av11}\right)^{av12}}{1 + \left(\frac{NR}{av7}\right)^{av8} \cdot \left(\frac{ARL}{av9}\right)^{av10} \cdot \left(\frac{MRF}{av11}\right)^{av12}},$$

wherein Audiovisual_Quality is a multimedia initial quality, NR is a quantity of rebufferings, ARL is a rebuffering duration, MRF is an impact factor between multiple rebufferings, and av7, av8, av9, av10, av11 and av12 are constants.

23. A multimedia quality monitoring apparatus comprising a processor and a memory, wherein the memory stores an instruction that enables the processor to implement the following operations to acquire a multimedia distortion quality due to packet loss, the operations comprising:

determining at least one of (a) a video distortion quality due to packet loss and (b) an audio packet loss distortion quality due to packet loss, where the video distortion quality is determined according to a video quality due to packet loss and a reference video quality, and the audio packet loss distortion quality is determined according to an audio quality due to packet loss and a reference audio quality;

determining at least one of (a) a video packet loss distortion factor and (b) an audio packet loss distortion factor, where the video packet loss distortion factor is determined according to the video distortion quality and the reference video quality, and the audio packet loss distortion factor is determined according to the audio packet loss distortion quality and the reference audio quality;

determining a multimedia packet loss distortion factor according to at least one of the video packet loss distortion factor and the audio packet loss distortion factor; and determining the multimedia distortion quality due to packet loss according to the multimedia packet loss distortion factor and the reference quality of the multimedia.

24. A multimedia quality monitoring apparatus comprising a processor and a memory, wherein the memory stores an instruction that enables the processor to implement the following operations to acquire a multimedia distortion quality due to packet loss, due to rebuffering according to a rebuffering parameter, the operations comprising:

acquiring a multimedia distortion quality due to rebuffering AV_DR according to $$AV\_DR = (Audiovisual\_Quality - MOS\_MIN) \cdot \frac{\left(\frac{NR}{av7}\right)^{av8} \cdot \left(\frac{ARL}{av9}\right)^{av10} \cdot \left(\frac{MRF}{av11}\right)^{av12}}{1 + \left(\frac{NR}{av7}\right)^{av8} \cdot \left(\frac{ARL}{av9}\right)^{av10} \cdot \left(\frac{MRF}{av11}\right)^{av12}},$$

wherein Audiovisual_Quality is a multimedia initial quality, NR is a quantity of rebufferings, ARL is a rebuffering duration, MRF is an impact factor between multiple rebufferings, and av7, av8, av9, av10, av11 and av12 are constants.

* * * * *